(12) United States Patent
Zhu et al.

(10) Patent No.: US 10,659,152 B2
(45) Date of Patent: May 19, 2020

(54) METHOD AND DEVICE FOR MEASURING THE QUALITY OF ELECTRICAL CHANNEL

(71) Applicant: STATE GRID JIANGSU ELECTRIC POWER CO., LTD NANJING POWER SUPPLY COMPANY, Nanjing (CN)

(72) Inventors: Hong Zhu, Nanjing (CN); Wei Li, Nanjing (CN); Lei Wei, Nanjing (CN); Min Lu, Nanjing (CN); Shaoyong Guo, Nanjing (CN); Qiusheng Li, Nanjing (CN); Yangling Chen, Nanjing (CN); Jingwei Li, Nanjing (CN)

(73) Assignee: STATE GRID JIANGSU ELECTRIC POWER CO., LTD NANJING POWERSUPPLY COMPANY, Nanjing (CN)

(*) Notice: Subject to any disclaimer, the term of this patent is extended or adjusted under 35 U.S.C. 154(b) by 74 days.

(21) Appl. No.: 15/990,702

(22) Filed: May 28, 2018

(65) Prior Publication Data

US 2018/0359026 A1 Dec. 13, 2018

(30) Foreign Application Priority Data

Jun. 7, 2017 (CN) .......................... 2017 1 0424037

(51) Int. Cl.
*H04B 10/077* (2013.01)
*H04B 10/80* (2013.01)

(52) U.S. Cl.
CPC ....... *H04B 10/0775* (2013.01); *H04B 10/808* (2013.01)

(58) Field of Classification Search
None
See application file for complete search history.

(56) References Cited

U.S. PATENT DOCUMENTS

| 2007/0127487 A1* | 6/2007 | Kim ................... H04J 3/1694 370/392 |
| 2007/0230480 A1* | 10/2007 | Ikeda .................. H04L 47/10 370/395.52 |
| 2012/0166819 A1* | 6/2012 | Skubic ................ G06F 1/3278 713/300 |
| 2013/0022356 A1* | 1/2013 | Ghazisaidi ......... H04Q 11/0067 398/66 |
| 2015/0214768 A1* | 7/2015 | Matsuyama ........... G06Q 50/06 700/296 |
| 2015/0271255 A1* | 9/2015 | Mackay ............... H04L 67/101 709/226 |

FOREIGN PATENT DOCUMENTS

JP 2007074740 A * 3/2007

* cited by examiner

*Primary Examiner* — Jai M Lee
(74) *Attorney, Agent, or Firm* — Treasure IP Group, LLC

(57) ABSTRACT

The embodiment of the invention provides a measurement method and a measurement device for quality of a power distribution and utilization channel. The method comprises the steps of determining priority of each branch in the power distribution and utilization channel of which the quality is to be measured; and determining quality of the power distribution and utilization channel of each branch according to the priority. The method and the device are used for improving monitoring strength on a whole optical fiber channel, and enhancing application universality.

2 Claims, 2 Drawing Sheets

METHOD AND DEVICE FOR MEASURING THE QUALITY OF ELECTRICAL CHANNEL

CROSS REFERENCE TO RELATED APPLICATION

This application claims priority to Chinese Application No. 201710424037.0, filed on Jun. 7, 2017. The Chinese Application are incorporated herein by reference in its entirety.

TECHNICAL FIELD

The implementation of the invention relates to the field of intelligent technology of distribution network operation. More specifically, the implementation of the invention relates to a method and a device for measuring the quality of the electric channel.

TECHNICAL BACKGROUND

The purpose of this section is to provide background or context for the implementation of the present invention stated in the claim. The description here is not recognized as an existing technology because of what is disclosed and described in this section.

With the rapid development of smart power grid, the operation types of distribution network are also diversified, and a large number of operations have high requirements for supporting network. In many communication media, optical fiber communication is one of the mainstream technologies of power communication system with its high speed and high reliability. With the diversification and rapid development of the operation, the access network also needs higher rate and reliability guarantee. At the same time, the international mainstream passive optical network EPON technology has also entered the researcher's field of vision. In the existing technology, a method of on-line monitoring E1 channel quality and monitoring system, through setting up the AD conversion module in the physical layer of E1 channel, setting the FPGA module in the link layer, the network layer setting up the CPU module in the network layer, has realized without interruption from E1 channel, constantly monitoring the channel, and monitoring channel quality within the physical layer to the network layer. However, the scheme can only monitor E1 channel, and the monitoring of the whole fiber channel is not enough. So, the plan is circumscribed.

SUMMARY OF THE INVENTION

Existing on-line quality monitoring system and method for E1 channel can only monitor E1 channel, and lacks of the monitor of the entire fiber channel thus the current existing online quality monitoring systems and method have many limitations.

This invention discloses a novel method and device, which uses computer programs and measurement apparatus to monitor electric channel quality. With these improvement, the monitoring of the entire fiber channel is achieved and it can be utilized in different applications thus having an enhanced versatility.

In a first aspect of the present invention, a method for measuring the quality of electric channel is provided, which including the steps described below.

According to the first aspect of the present invention, in a first embodiment, the priority of each branch in the distribution channel is first determined in the following manner:

$$P_i = P_i^0 + \frac{s + s_i}{s_i}$$

In the above equation, $P_i^0$ is an initial priority of the ith branch, and s is the time to wait for the measurement. $P_i$ is the priority of the ith branch, and $S_i$ is the predicated execution time to accomplish the operation in the ith branch.

According to the first aspect of the present invention, in a second embodiment, the quality of the power supply channel for each branch is determined according to its priority level. Said method includes determining the quality of the power supply channel of each branch in an order of high to low, according to its priority level, and in that order, re-setting the priority of the branch whose electrical channel quality has been determined to the lowest priority afterwards.

According to the first aspect of the present invention, in a third embodiment, prior to determining the priority of each branch in the power supply channel, the method also includes that two probes are set up in the power supply channel to be used for the quality measurement of the power supply channel, and the probe is used for transmitting the information detected about the quality of the distribution channel.

According to the first aspect of the present invention, in the first to third embodiments described above, in a fourth embodiment, the power supply channel for the quality measurement of the electric channel to be used including an ONU end.

In a second aspect of the present invention, an apparatus for measuring the quality of the power supply channel is provided, including:
a determination module, which is used to determine the priority of each branch in the distribution channel for the power supply channel for the quality measurement of the distribution channel; and
an execution module, which is used to determine the quality of the power supply channel for each branch according to the priority.

According to the second aspect of the present invention, in a first embodiment, the determination module is specifically used to determine the priority of each branch in the power supply channel in a manner described below:

$$P_i = P_i^0 + \frac{s + s_i}{s_i}$$

In the above equation, $P_i^0$ is the initial priority of the ith branch, and s is the time to wait for the measurement. $P_i$ is the priority of the ith branch, and $S_i$ is the predicated execution time of the business in the ith branch.

According to the second aspect of the present invention, in the second embodiment, the execution module is specifically used to determine the quality of the power supply channel for each branch according to the high to low priority level and set the priority of the branch that has been identified the quality of the electrical channel to the lowest priority in turn.

According to the third aspect of the present invention, a computer program product is characterized by that the computer program product includes a computer program stored in a non-transient computer readable storage medium, and the computer program includes program instructions. Wherein, when the program instruction is executed by the computer, making the computer perform the methods described in the first aspect.

In the fourth of the present invention, A measuring device is characterized by including at least one processor and a memory that communicates with at least one processor.

Wherein the memory store has instructions that can be executed by at least one processor, and the instructions are executed by at least one of the processors, to enable at least one processor to perform the method described in the first aspect.

By adopting the above technical scheme, the priority of each branch in the power supply channel for the quality measurement is determined. According to the priority level, the quality of the distribution channel of each branch is determined, which is used to improve the monitoring of the whole fiber channel and enhance the universality of the application.

DESCRIPTION OF DRAWINGS

The above and other purposes, features and advantages of the exemplary embodiment of the invention will become easy to understand by referring to the attached figure and detailed description below.

Figure 1:
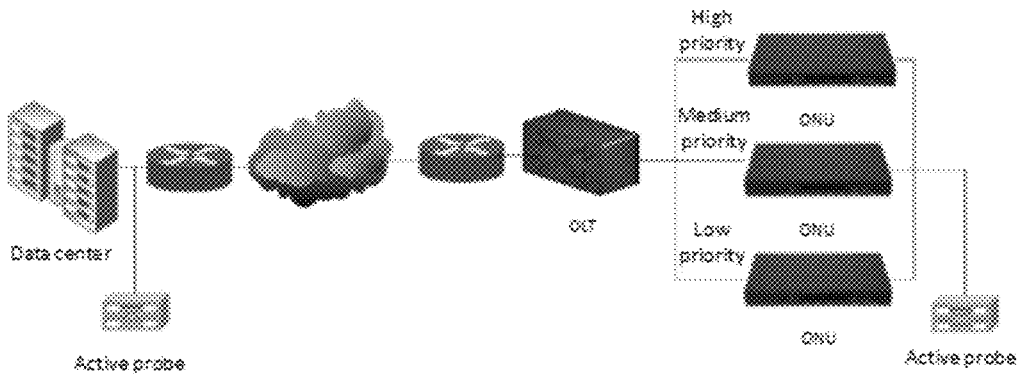
FIG. 1 shows the schematic diagram of the application in accordance with the embodiment of the present invention.

In the attached figure, the same or corresponding label represents the same or corresponding part.

DETAIL DESCRIPTION OF EMBODIMENTS

The principles and spirit of the present invention are described in a number of exemplary embodiments. It should be understood that these methods are given only to enable the technical personnel in the field to better understand and realize the invention, and not to limit the scope of the invention in any way. Instead, these are provided in order to make the disclosure more thorough and complete, and to convey the full extent of the disclosure to the technical staff in the field.

The technical personnel in this field know that the implementation of the invention can be realized as a system, device, method or computer program product. Therefore, this disclosure can be specifically implemented as follows: complete hardware, complete software (including firmware, resident software, microcode, etc.), or the combination of hardware and software.

According to the implementation of the present invention, a method and device for measuring the quality of the power supply channel are presented.

In addition, the number of any elements in the diagram is used for the example rather than the restriction, and any naming is used only for differentiating, without any restriction.

Hereinafter, the principle and spirit of the present invention will be explained in detail with reference to several representative embodiments of the present invention.

DESCRIPTION OF THE INVENTION

The inventor found that the existing method for on-line monitoring of the quality of the E1 channel and its monitoring system can only monitor the E1 channel, and the monitoring intensity for the entire fiber channel is not sufficient, so there are big limitations.

In view of this, embodiments of the present invention provide a method and apparatus for measuring the quality of a power distribution channel to increase the monitoring intensity of the entire optical fiber channel and enhance the universal applicability of the application. The specific implementation manner includes determining the priority of each branch in the power distribution channel which will be used for measuring the quality of the power distribution channel and determining the quality of the power channel for each branch according to the priority.

Having introduced the basic principles of the invention, various non-limiting embodiments of the invention are specifically described below.

EXEMPLARY METHODS

Example 1

There are many kinds of intelligent distribution communication services, and each type of service has different requirements for channel bandwidth and transmission delay.

Among them, the distribution telecommunications service includes intelligent distribution terminal communication services, energy storage station status monitoring services, distributed energy station control information services, equipment operation status monitoring services, distributed energy station curve prediction information services, and transformer information acquisition services and load measurement management business.

In an EPON for a power distribution network, most of the connection port is not accessible. Based on this application scenario, the present invention discloses a first embodiment, a quality measurement method for a power distribution channels is disclosed. This method operates under the principle to measure the quality of each channel of power distribution based on their respective priorities. As FIG. 1 illustrated, in the EPON for the power distribution channels, a first active probe is placed next to a data center through a bypass link, a second active probe is placed next to an end of the ONU through another bypass link, the first and second active probes exchange measured information and obtain the information about the quality of the power distribution channels. Wherein the one optical fiber is provided with one optical line terminal (OLT) and multiple of optical network units (ONUs) are provided for one optical line terminal. Multiple optical network units (ONUs) are provided for multiple branching power distribution channels.

The priority of each branch is calculated as the following.

Assuming that there are m branches, any individual branch i has an initial priority $P_i^0$ according to the transmission service. As the time for the measurement of the branch s increases, the priority of each branch changes, and the calculation formula of the priority of each branch is as follows:

$$P_i = P_i^0 + \frac{s + s_i}{s_i} \qquad (1)$$

In the above equation, s is the estimated execution time of the service in the channel. It can be known from Formula (1) that as the waiting time increases, the priority of the channel increases. The active probe will measure the highest priority channel each time, and the channel priority will be reduced to the lowest after the measurement is completed, and then the channel with the highest priority will be searched for quality measurement.

Figure 2:
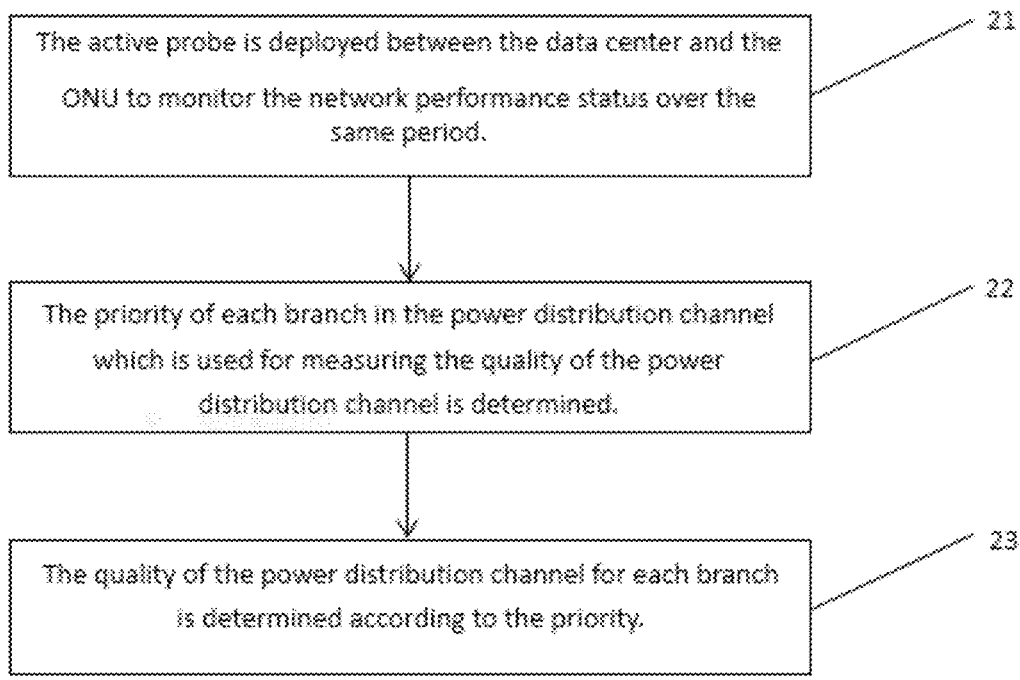
FIG. 2 shows the schematic diagram of the method of measuring the quality of the electric channel according to the method of the present invention.

Based on the foregoing description, the embodiment of the invention further provides a method for measuring the quality of a power distribution channel. As shown in FIG. 2, the specific process flow is as the following.

In step 21, the active probe is deployed between the data center and the ONU to monitor the network performance status over the same period.

In step 22, the priority of each branch in the power distribution channel which is used for measuring the quality of the power distribution channel is determined.

Wherein, the specific implementation manner of determining the priority of each branch in the power distribution channel is described in detail in formula 1, as the following:

$$P_i = P_i^0 + \frac{s + s_i}{s_i}$$

In the above formula, $P_i^0$ is the initial priority of the ith branch, and s is the branch waiting measurement time, and $P_i$ is the ith branch priority, and $s_i$ is the expected execution time of the service in the ith branch.

In step 23, the quality of the power distribution channel for each branch is determined according to the priority.

The quality of the power distribution channel of each branch is determined with a priority from high priority to low priority, and the priority of each branch whose quality has been determined is again set to the lowest priority.

In one specific implementation, an example is given in detail. Assuming that branch 4, branch 5, and branch 1, have been determined priority levels and ranked from high priority to low priority in that order. Then the quality of the channel of branch 4 is measured first. After the quality of the channel is determined, the priority of branch 4 is set to be the lowest priority, for example 0, and then the quality of the channel of the branch 5 is determined. After the quality of the channel of the branch 5 is determined, Branch 5 is set to the lowest priority, such as 0.

Figure 3:
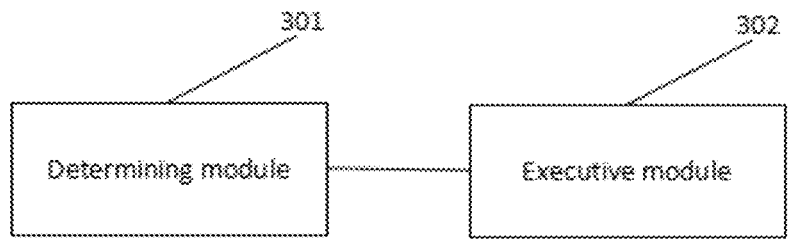
FIG. 3 shows the schematic diagram of the device structure with the quality of the electric channel according to the method of the present invention.

At the same time, the priority for branch 4 can be increase from 0 to 1 or still maintain the lowest priority Exemplary Device After introducing the method of the exemplary embodiment of the invention, the apparatus of the exemplary embodiment of the invention is referred to FIG. 3.

As shown in FIG. 3, the apparatus for measuring the quality of a power distribution channel provided by an embodiment of the invention may include:

The determination module 31 is used to determine the priority of each branch in the power distribution channel which will be used for measuring the quality of the power distribution channel.

The determination module 31 is used to determine the quality of the power channel for each branch according to the priority.

Specifically, the apparatus of the exemplary embodiment of the invention for measuring the quality of the power distribution channel.

The determining module 31 is specifically configured to determine the priority of each branch in the power distribution channel according to the following manner:

$$P_i = P_i^0 + \frac{s + s_i}{s_i}$$

In the above formula, $P_i^0$ is the initial priority of the ith branch, s is the branch waiting for measurement time, $P_i$ is the ith branch priority, and $s_i$ is the expected execution time of the service in the ith branch.

Specifically, the execution module 32 is used to determine the quality of the power distribution channel of each branch in an order from high priority to low priority, and set the priority of the branch whose quality has been determined to the lowest.

In some embodiments, a measuring device according to the present invention may include at least one processor and at least one memory. Wherein, the memory stores a program code, and when the program code is executed by the processor, the processor is caused to perform various steps in the channel quality measurement according to various exemplary embodiments of the invention described in the above-described "exemplary method" section of this specification. For example, as shown in FIG. 2, the processor may perform the step 21: the active probe is deployed between the data center and the ONU to monitor the network performance status over the same period, or the step 22: the priority of each branch in the power distribution channel which is used for measuring the quality of the power distribution channel is determined, or the step 23, the quality of the power distribution channel for each branch is determined according to the priority.

In some embodiments, there is a computer program product provided, characterized in that the computer program product comprises a computer program stored on a non-transitory computer-readable storage medium, and the computer program include program instructions, wherein when the program instructions are executed by a computer, it is noted that the computer is to perform the "exemplary method" as described in the present specification. It should be noted that although several units or sub-units of the device are mentioned in the above detailed description, this division is merely exemplary and not mandatory. In fact, according to embodiments of the present invention, the features and functions of the two or more units described above may be embodied in one unit. Conversely, the features and functionality of one element described above can be further divided into multiple elements.

Moreover, although operations of the method of the present invention have been described in a specific order in the drawings, this does not mean that these operations must be performed in this particular order, or that all illustrated operations must be performed to achieve the desired results. Additionally or alternatively, some steps may be omitted, multiple steps may be combined into one step, and/or one step may be broken down into multiple steps.

Although the spirit and principle of the present invention have been described with reference to a number of specific embodiments, it should be understood that the present invention is not limited to the disclosed specific embodiments and The division of all aspects does not mean that the features in these aspects cannot be combined to benefit. This division is only for the convenience of expression. The invention is intended to cover various modifications and equivalent arrangements included within the spirit and scope of the appended claims.

We claim:

1. A system to measure a quality for power distribution channels,
wherein said system using an EPON (Ethernet passive optical network) for communication network, comprising
[1]
a data center,
an optical line terminal (OLT) of the EPON and multiple optical network units (ONUs) are provided for the optical line terminal (OLT);
multiple optical network units (ONUs) are provided for multiple branching power distribution channels;
a first active probe, disposed between the data center and the optical line terminal (OLT),
a second active probe, disposed on a side path gathering the multiple ONUs, through another bypass link,
wherein the first and second active probes are configured to exchange measured information and obtain information about the quality of the power distribution channels;
[2] a determination module,
configured to determine priority of each branch in the power distribution channel for the quality measurement of the distribution channel,
included in the system for quality measurement of the power distribution channels,
comprising a non transient computer readable storage medium of the power distribution channels,
having stored thereon a computer program, said program arranged to:
Operate a first processor to perform a method step of:
calculating the priority of each branch in the distribution channel in the following manner:

$$P_i = P_i^0 + \frac{s + s_i}{s_i}$$

wherein $P_i^0$ is an initial priority of an ith branch, and s is a time to wait for the measurement, $P_i$ is a priority of the ith branch, and $S_i$ is an expected execution time of a business in the ith branch
[3] an execution module,
by using a measuring device, which is characterized by including at least one second processor and a memory that communicates with the second processor and wherein, the memory has instructions that can be executed by the second processor, and the instructions are executed by the second processor, to enable the second processor to perform the method of
monitoring quality, of the power distribution channel of each branch in an order from high priority to low priority, by allowing the active probes to search for the highest priority branching channel, and
setting the priority of the branch whose quality has been measured to be the lowest priority.

2. A method for measuring a quality of a power distribution network, having multiple branching power distribution channels, comprising
[1]
using an EPON as a communication network for the power distribution work, which is comprised of an optical line terminal (OLT) of the EPON and multiple optical network units (ONUs), said multiple optical network units (ONUs) correspond to the multiple branching power distribution channels of the power distribution network;
placing a first active probe between a data center of the EPON and one ONU of the multiple optical network units (ONUs) through a bypass link;
placing a second active probe on an end of the ONU through another bypass link;
[2] sending and receiving quality information between the first and second active probes monitor a network quality status over a same period of time,
[3] determining a priority for each branching power distribution channel in the following manner:

$$P_i = P_i^0 + \frac{s + s_i}{s_i}$$

wherein $P_i^0$ is an initial priority of an ith branch, and s is a time to wait for the measurement, $P_i$ is a priority of the ith branch, and Si is an expected execution time of a business in the ith branch; and
[4] measuring quality of the branching power distribution channel according to a priority level, including
determining the quality of the individual branching power distribution channel from a high priority to a low priority, and
setting the priority of the branching power distribution channel that has been identified and measured to be the lowest priority in turn.

* * * * *